US010659662B2

(12) United States Patent
Takada et al.

(10) Patent No.: US 10,659,662 B2
(45) Date of Patent: May 19, 2020

(54) WEARABLE CAMERA

(71) Applicant: Panasonic i-PRO Sensing Solutions Co., Ltd., Fukuoka (JP)

(72) Inventors: Noboru Takada, Fukuoka (JP); Tatsuya Tobimatsu, Fukuoka (JP); Yasuhito Oomori, Kanagawa (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 11 days.

(21) Appl. No.: 15/831,050

(22) Filed: Dec. 4, 2017

(65) Prior Publication Data

US 2018/0167537 A1    Jun. 14, 2018

(30) Foreign Application Priority Data

Dec. 9, 2016    (JP) .................. 2016-239626

(51) Int. Cl.
| | |
|---|---|
| *H04N 5/225* | (2006.01) |
| *G03B 17/56* | (2006.01) |
| *H04N 7/18* | (2006.01) |
| *F16M 13/04* | (2006.01) |
| *H04N 5/77* | (2006.01) |

(52) U.S. Cl.
CPC .......... *H04N 5/2252* (2013.01); *F16M 13/04* (2013.01); *G03B 17/561* (2013.01); *H04N 7/18* (2013.01); *H04N 7/183* (2013.01); *H04N 7/185* (2013.01); *G03B 2217/002* (2013.01); *H04N 5/772* (2013.01)

(58) Field of Classification Search
CPC ...... H04N 5/2252; H04N 5/225; H04N 5/772; H04N 7/18; G03B 17/56; G03B 17/02
See application file for complete search history.

(56) References Cited

U.S. PATENT DOCUMENTS

| | | | | |
|---|---|---|---|---|
| 5,886,739 | A * | 3/1999 | Winningstad | .......... H04N 7/185 348/115 |
| 7,758,117 | B2 * | 7/2010 | Chang | ................ B60R 11/0235 297/217.1 |
| 7,762,627 | B2 * | 7/2010 | Chang | ................ B60R 11/0235 297/217.3 |
| 10,054,845 | B1 * | 8/2018 | Garcia | ................ G03B 17/561 |
| D846,620 | S  * | 4/2019 | Katori | .......................... D16/219 |
| 10,480,711 | B1 * | 11/2019 | Tran | .......................... A45F 5/02 |
| 2003/0173383 | A1 * | 9/2003 | Greene | .................. F16M 13/04 224/265 |

(Continued)

FOREIGN PATENT DOCUMENTS

JP    2016/0191862 A1    7/2016

*Primary Examiner* — Antoinette T Spinks
(74) *Attorney, Agent, or Firm* — Seed IP Law Group LLP

(57) ABSTRACT

A wearable camera includes a casing that hoses an imaging unit and includes a front surface in which a lens is exposed, and a rear surface in a direction along a vertical surface serving as a surface on a mounting side, an attachment surface that is formed on the rear surface and on which a casing holding member is detachably attached without screwing, and a protrusion that comes in contact with a magnet protruding from the casing near an upper end of the attachment surface and attached to the attachment surface to restrict downward movement of the casing with respect to the magnet.

13 Claims, 14 Drawing Sheets

(56) References Cited

U.S. PATENT DOCUMENTS

| | | | |
|---|---|---|---|
| 2014/0092299 A1* | 4/2014 | Phillips | H04N 5/2252 |
| | | | 348/376 |
| 2014/0267742 A1* | 9/2014 | Tapia | H04N 7/183 |
| | | | 348/157 |
| 2015/0189133 A1* | 7/2015 | Sandy | H04N 5/44 |
| | | | 348/376 |
| 2016/0112636 A1* | 4/2016 | Yamaguchi | H04N 5/23245 |
| | | | 348/158 |
| 2016/0142684 A1* | 5/2016 | Gruder | H04N 5/2251 |
| | | | 348/158 |
| 2016/0148536 A1* | 5/2016 | Ashby | G09B 19/0092 |
| | | | 434/127 |
| 2016/0165958 A1* | 6/2016 | Davis | A41B 1/10 |
| | | | 2/255 |
| 2016/0182826 A1* | 6/2016 | Blum | H04N 5/23241 |
| | | | 348/372 |
| 2016/0191862 A1 | 6/2016 | Yokomitsu et al. | |
| 2017/0026568 A1* | 1/2017 | Haehnichen | H04N 5/23248 |
| 2017/0085829 A1* | 3/2017 | Waniguchi | H04N 5/77 |
| 2017/0105510 A1* | 4/2017 | Tran | A45F 5/02 |
| 2017/0195635 A1 | 7/2017 | Yokomitsu et al. | |
| 2018/0063421 A1* | 3/2018 | Yokomitsu | H04N 5/232 |
| 2018/0109765 A1* | 4/2018 | Wu | H04N 7/185 |
| 2018/0176500 A1* | 6/2018 | Yokomitsu | H04N 5/77 |
| 2018/0240621 A1* | 8/2018 | Oomori | H01H 13/84 |

* cited by examiner

FIG. 11A
FIG. 11B
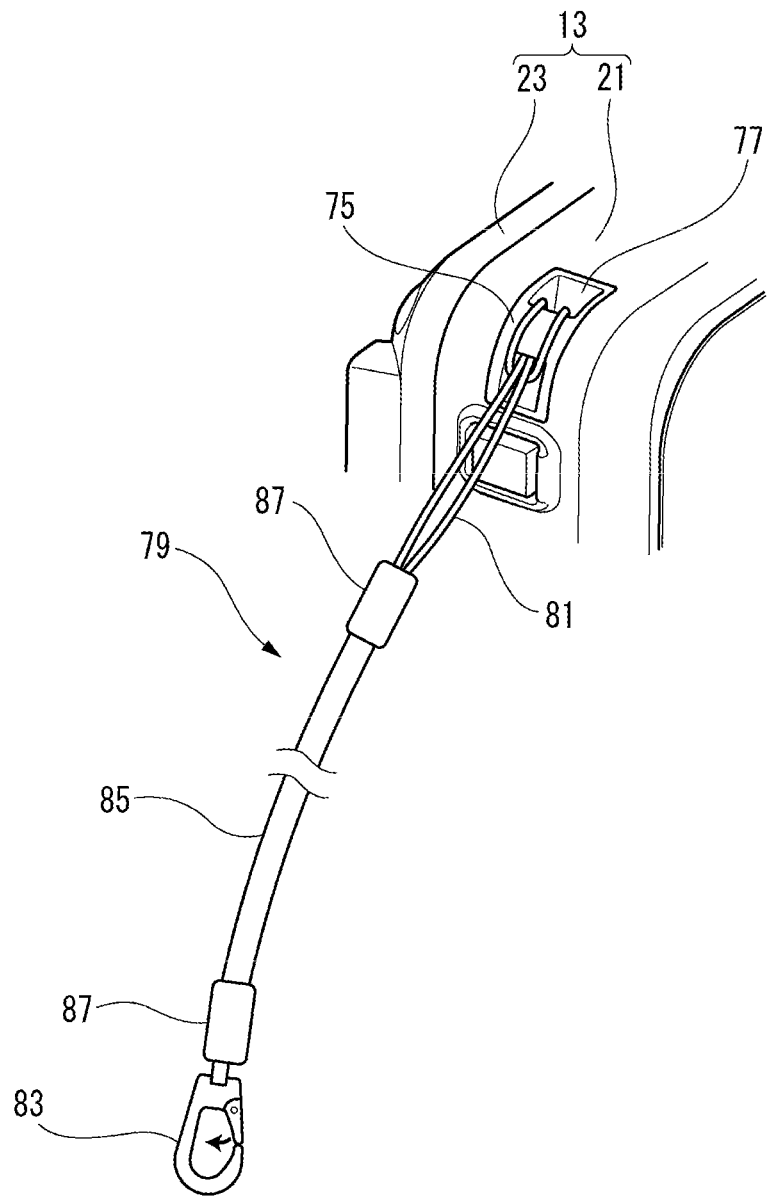
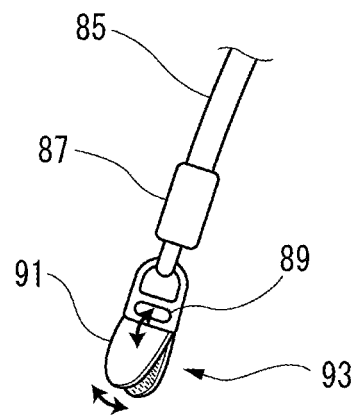

WEARABLE CAMERA

BACKGROUND

1. Technical Field

The present disclosure relates to a wearable camera mounted on or held by clothes of a user and capturing a still image or a moving image.

2. Description of the Related Art

For example, a wearable camera used to support the work of police officers and security guards is mounted on clothes worn by a user in order to capture a field of view from a position close to the user's viewpoint as an image, such as the chest of the police officers (for example, see Japanese Patent Unexamined Publication No. 2016-122918).

In addition, the wearable camera houses a battery that supplies power to each part of the built-in electronic parts or the like inside a casing. This battery is constituted by, for example, a rechargeable secondary battery. By setting the casing in a charger, the wearable camera performs charging the battery by connecting a contact terminal of the casing to a charging contact of the charger.

However, a wearable camera of the related art including Japanese Patent Unexamined Publication No. 2016-122918 does not take into account the prevention of falling off when worn. Especially, when the user (it goes without saying that the user is not limited to police officers and security guards, the same below) runs for some reason, the force in the direction of gravity (downward) due to inertia acting on the wearable camera is likely to cause relative displacement (for example, falling-off) to the clothes and casing. As a result, the state at the time of mounting may not be maintained in some cases. If the attached state of the wearable camera is not maintained, there is a possibility that a desired image cannot be obtained by the user, or the wearable camera may fall off and be damaged.

Alternatively, some wearable cameras have a clip that is screwed to a rear surface of the casing in order to enhance a holding ability to the clothes and the like. However, when setting a wearable camera with a clip to a charger, the clip becomes an obstacle and hinders when charging. In this case, each time charging is performed, the screwing has to be released and re-fixed to detach the clip from the casing, which is inconvenient for the user.

SUMMARY

In view of the above-described circumstances of the related art, an object of the present disclosure is to provide a wearable camera capable of improving usability and suppressing falling-off from a mounting state at the time of use.

The present disclosure provides a wearable camera including a casing that includes a front surface in which a lens is exposed and a rear surface in a direction along a vertical surface serving as a surface on a mounting side, an attachment surface that is formed on the rear surface and on which a casing holding member is detachably attached, and a protrusion that protrudes from the casing in the vicinity of an upper end of the attachment surface and comes in contact with the casing holding member attached to the attachment surface to restrict downward movement of the casing with respect to the casing holding member.

According to the present disclosure, it is possible to improve usability when using the wearable camera and to suppress falling-off from a mounting state at the time of use.

BRIEF DESCRIPTION OF THE DRAWINGS

FIG. 11A is a perspective view of a main part showing an example of a strap attached to the shaft portion, and FIG. 11B is a perspective view of a main part showing a modification example of a hook.

DETAILED DESCRIPTION

Hereinafter, an embodiment of a wearable camera according to the present disclosure (hereinafter, referred to as "the present embodiment") will be described in detail with reference to drawings as appropriate. However, a detailed description more than necessary may be omitted. For example, there are cases where a detailed description of well-known matters and redundant description on substantially the same configuration may be omitted. This is for avoiding unnecessary redundancy of the following description and facilitating understanding by those skilled in the art. The accompanying drawings and the following description are provided to enable those skilled in the art to fully understand the present disclosure and are not intended to limit the claimed subject matters.

Figure 1:
FIG. 1 is a schematic view showing an example of a state in which a user (for example, a police officer) wears a wearable camera of the present embodiment.

FIG. 1 is a schematic view showing an example of a state in which a user (for example, police officer 11) wears wearable camera 100 of the present embodiment.

The wearable camera according to the present embodiment will be described assuming a case where a police officer who works for a police station uses the wearable camera at the time of patrol to pick up an image, for example. However, as a use scene of the wearable camera, it is possible to assume a case when the police officer hurries to a scene where an incident or an accident occurs.

Wearable camera 100 is used by police officer 11 as an example of the user, captures and accumulates a forward situation at the time of patrol so as to store as a still image or a moving image (video), and for example, transfers captured image data to, for example, a back-end system in the police station. The user is not limited to police officer 11 and wearable camera 100 may be used in various other workplaces (for example, security companies).

Wearable camera 100 is mounted on the body of or the clothes (for example, uniform worn by a police officer, the same below) worn by police officer 11 so as to capture the visual field from the position close to the viewpoint of police officer 11 such as the chest of police officer 11 as an image. With wearable camera 100 attached, police officer 11 operates recording switch SW 1 to capture images of surrounding subjects.

In wearable camera 100, imaging lens 17, recording switch SW 1, and snapshot switch SW 2 constituting an imaging unit are provided on front surface 15 of casing 13 having a substantially rectangular parallelepiped shape. Recording (capturing a moving image) is started when recording switch SW 1 by being pressed for an odd number of times by police officer 11, for example, and is ended when pressed for an even number of times. Every time snapshot switch SW 2 is pressed by police officer 11, a still image at that time is captured, for example.

Configuration Example of Magnet Type Specification

Figure 2:
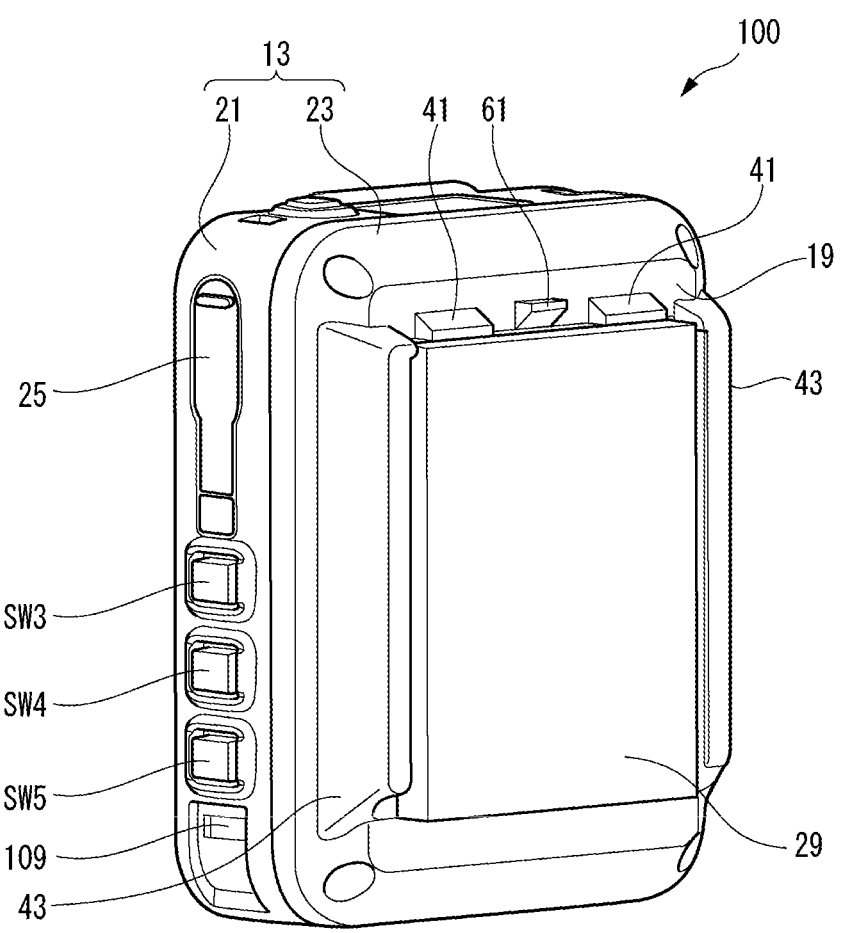
FIG. 2 is a rear perspective view when the wearable camera of the present embodiment is used as a magnet type.

FIG. 2 is a rear perspective view when wearable camera 100 of the present embodiment is used as a magnet type.

Wearable camera 100 according to the present embodiment houses an imaging unit (not shown) in casing 13. Casing 13 exposes imaging lens 17 constituting the imaging unit to front surface 15. On casing 13, the surface opposite to front surface 15 is rear surface 19. Rear surface 19 is a surface in a direction along a vertical surface and is a surface on an attachment side to the clothes (for example, uniform worn by police officer 11) and the like. Casing 13 is constituted by front surface casing 21 and back lid 23 having above rear surface 19.

On the right side viewed from the front of casing 13 of wearable camera 100, accessory connecting portion 25, communication mode switch SW 3, LED & Vibration switch SW 4, OFF-switch SW 5, and the like are provided from the upper side. Communication mode switch SW 3 is pressed, for example, to switch the communication mode between a communication device (for example, a back-end system in a police station, an in-vehicle camera system in a patrol car). LED & Vibration switch SW 4 is pressed, for example, to switch between Light Emission Diode (LED) and vibration in order to inform police officer 11 of the state of wearable camera 100. OFF-switch SW 5 is pressed, for example, to turn off the power of wearable camera 100.

On back lid 23 of casing 13, attachment surface 27 is formed. Attachment surface 27 is a rectangular flat surface. In attachment surface 27, the casing holding member is detachably attached without screwing.

In this configuration example (that is, magnet type specification), the casing holding member in wearable camera 100 is magnet 29. Magnet 29 is formed in a rectangular plate shape having approximately the same shape as attachment surface 27. Magnet 29 is placed in pocket 31 (see FIG. 5) of the clothes, for example. For this reason, it is preferable that magnet 29 is, for example, magnetized magnet rubber in consideration of safety.

Figure 3:
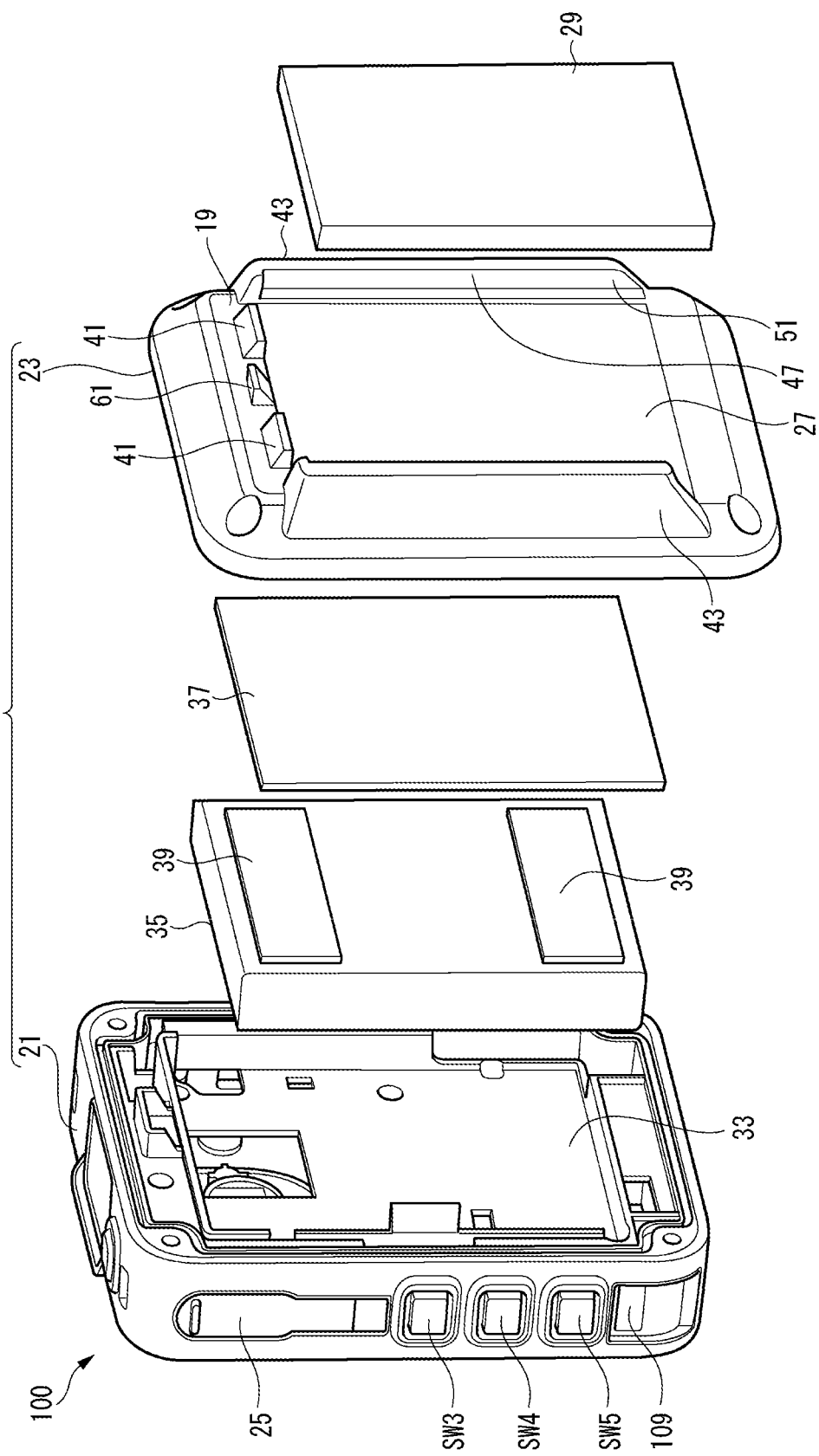
FIG. 3 is an exploded perspective view of FIG. 2.

FIG. 3 is an exploded perspective view of FIG. 2.

Front surface casing 21 has battery housing portion 33. Battery 35 is housed in battery housing portion 33. Battery 35 is constituted by, for example, a rechargeable secondary battery. As will be described later, wearable camera 100 connects the contact terminal of casing 13 to the charging contact of the charger by setting casing 13 in the charger to be described later and performs charging.

Battery 35 is formed in a flat rectangular parallelepiped shape having substantially the same outer shape as attachment surface 27. Metal plate 37 having substantially the same area is fixed to the surface of battery 35 facing back lid 23 with double-sided adhesive tape 39 or the like. Battery 35 to which metal plate 37 is fixed is arranged in battery housing portion 33 and housed inside the casing by screwing back lid 23 to front surface casing 21.

When back lid 23 of wearable camera 100 is attached, metal plate 37 is arranged near the back side of attachment surface 27. As a result, magnet 29 is attracted to attachment surface 27 by the magnetic attraction force of magnet 29 via back lid 23. The magnetic attraction force of magnet 29 is sufficiently large to hold the mass of wearable camera 100.

On back lid 23 of casing 13, protrusion 41 is provided near the upper end of attachment surface 27. In the present embodiment, a pair of protrusions 41 are provided in the left-right direction of attachment surface 27. Protrusion 41 protrudes from back lid 23 of casing 13 and comes in contact with magnet 29 attached to attachment surface 27. Casing 13 comes in contact with the upper-end face of magnet 29, whereby the downward movement of Casing 13 with respect to magnet 29 is restricted.

Figure 4:
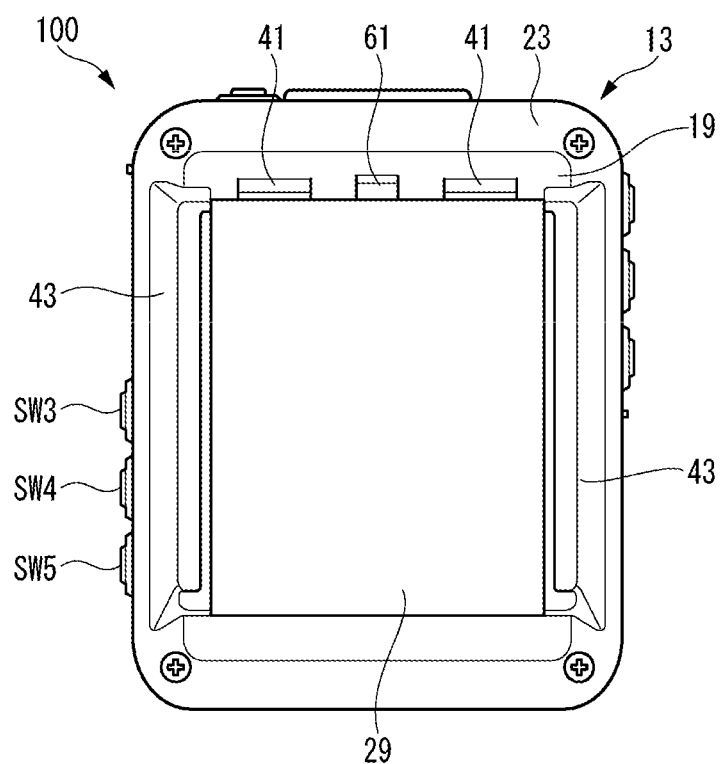
FIG. 4 is a rear view of FIG. 2.

FIG. 4 is a rear surface view of FIG. 2.

On back lid 23 of casing 13, there is provided a pair of facing wall portions 43 having a length such that attachment surface 27 is interposed between the right and left and protruding from rear surface 19. Respective facing wall portions 43 extend in the vertical direction in parallel. The distance between the pair of facing wall portions 43 is set slightly larger than the width of magnet 29 in the same direction. As a result, magnet 29 may enter between the pair of facing wall portions 43 with the fabric of pocket 31 interposed therebetween. In other words, magnet 29 which is in close contact with attachment surface 27 with the fabric interposed therebetween is surrounded by protrusion 41 and the pair of facing wall portions 43 in three directions of the upper-end face and the right and left-side faces.

Next, an operation of the above configuration will be described.

In wearable camera 100 according to the present embodiment, casing 13 is attached to the casing holding member provided on the clothes or the like of police officer 11 via attachment surface 27 of rear surface 19. In wearable camera 100, for example, when police officer 11 runs at the patrol or at the scene of an incident or accident, the force in the direction of gravitational force (downward) due to inertia acts greatly, and the wearable camera easily moves downward. When casing 13 starts to move downward with respect to the casing holding member, protrusion 41 formed at the upper end of attachment surface 27 comes in contact with the casing holding member.

As a result, casing 13 is restricted from moving in the downward direction parallel to attachment surface 27, and the state at the time of mounting is maintained. As a result, wearable camera 100 may suppress deterioration of image quality and may suppress falling-off from the mounting state at the time of being used by police officer 11.

In addition, wearable camera 100 realizes good charging operability in which protrusion 41 is arranged at the upper end of attachment surface 27 so that the lower part of casing 13 is inserted into the charger from the upward direction.

This may avoid situations in which, for example, an appropriate image cannot be captured, and the captured image cannot be used for later use (for example, image of evidence during patrol or on-site evidence to be submitted to prosecutors and courts).

In addition, in wearable camera 100, the casing holding member is detachably attached with respect to attachment surface 27 of casing 13 without screwing. Therefore, it is possible to attach and detach the casing holding member without releasing and re-fixing of screwing. As a result, at the end of use, the wearable camera may easily be in a state of not interfering with the charger and may be charged easily.

Figure 5:
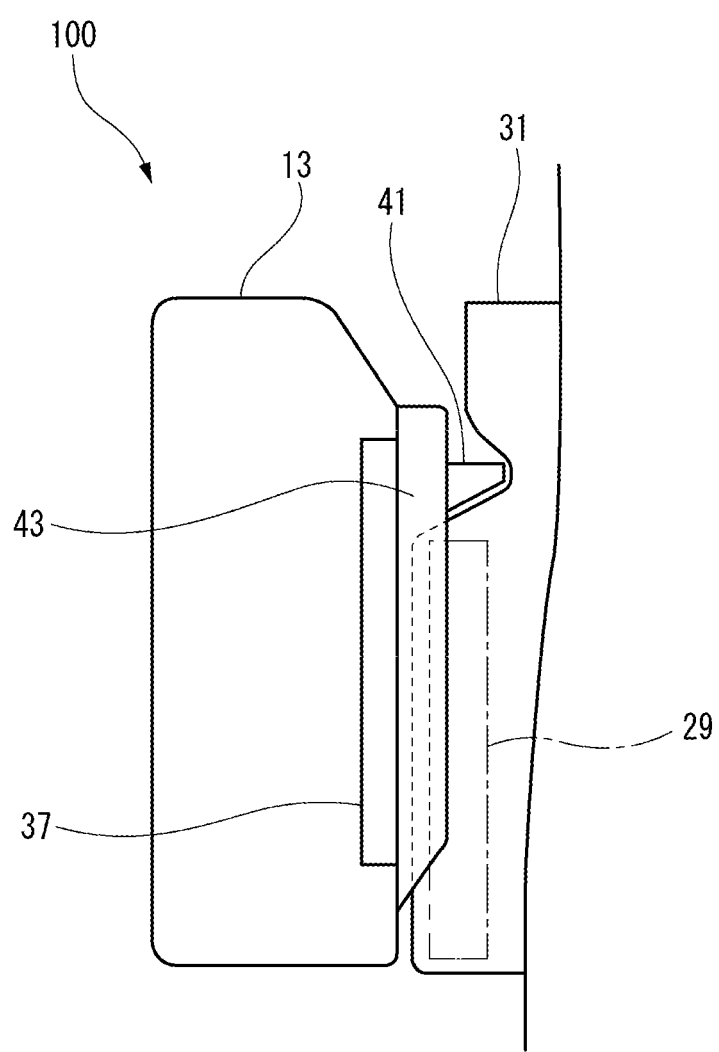
FIG. 5 is a longitudinal sectional view of the wearable camera mounted with a magnet placed in a pocket of clothes.

FIG. 5 is a longitudinal sectional view of wearable camera 100 mounted with magnet 29 placed in pocket 31 of the clothes.

In wearable camera 100, magnet 29 is placed in, for example, pocket 31 of the clothes, and attachment surface 27 of casing 13 comes in contact with on the outside of pocket 31. Magnetic attraction force acts between magnet 29 and metal plate 37. By this magnetic attraction force, the fabric of pocket 31 is interposed between magnet 29 and attachment surface 27, and casing 13 may be firmly fixed to the clothes. At the time of detachment, if police officer 11 separates casing 13 by applying an external force more than the magnetic attraction force against the magnetic attraction force, wearable camera 100 may be easily detached. At that time, magnet 29 falls off and is held in the pocket. No casing holding member remains on attachment surface 27, and detached wearable camera 100 may be set on the charger as it is.

In addition, in wearable camera 100, a casing holding member (for example, magnet 29) is also interposed by the pair of facing wall portions 43 protruding to the right and left of attachment surface 27. As a result, casing 13 and magnet 29 come in contact with each other at three points of protrusion 41 and the pair of facing wall portions 43, and it is possible to restrict the relative rotation around the axis perpendicular to attachment surface 27.

Figure 6:
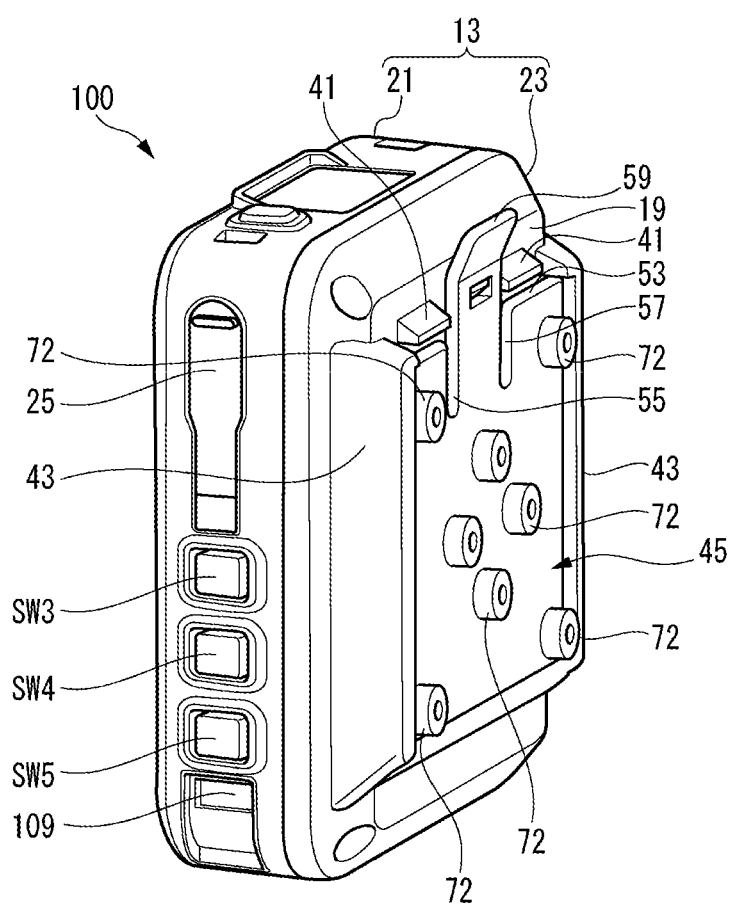
FIG. 6 is a rear perspective view when the wearable camera of the present embodiment is used as a clip type.

Configuration Example of Clip Type Specification FIG. 6 is a rear perspective view when wearable camera 100 of the present embodiment is used as a clip type.

Wearable camera 100 of the present embodiment is not limited to a magnet type and may be used as a clip type, for example. Same wearable camera 100 as the magnet type may be used. That is, instead of magnet 29, wearable camera 100 has a dual-purpose structure in which the clip that is the casing holding member may be used.

In wearable camera 100, plate 45 for fixing the clip is detachably attached to attachment surface 27. The size of plate 45 is slightly larger than the distance between the pair of facing wall portions 43 in the same direction. Plate 45 is made of metal or resin, for example.

Figure 7:
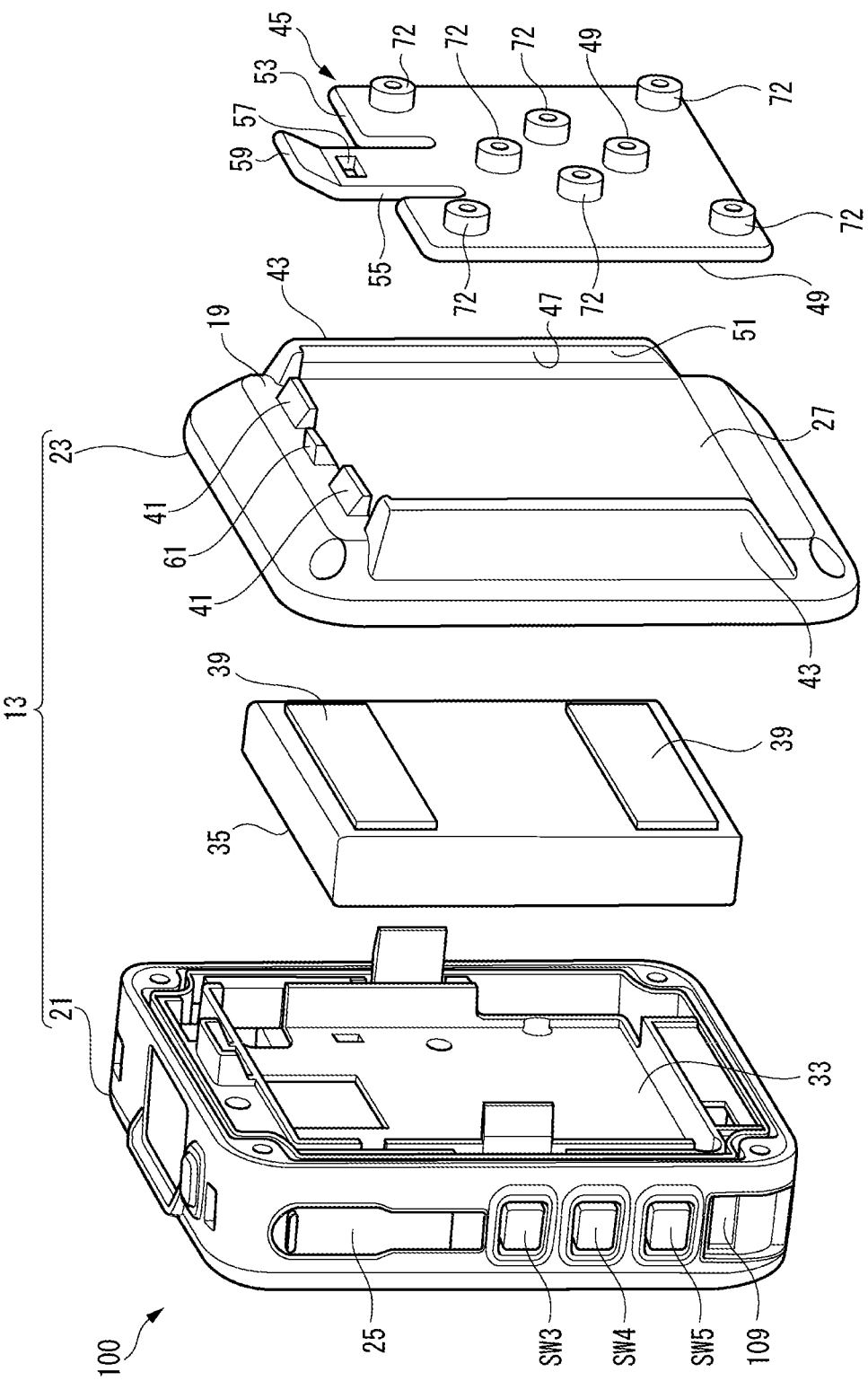
FIG. 7 is an exploded perspective view of FIG. 6.

FIG. 7 is an exploded perspective view of FIG. 6.

On the facing surfaces of the pair of facing wall portions 43, grooves 47 extending in the vertical direction are formed respectively. The groove width of groove 47 is set to be substantially the same as the plate thickness of plate 45, and thus both side edges 49 of plate 45 may be inserted. Groove 47 is open at the lower end of the pair of facing wall portions 43.

Figure 8:
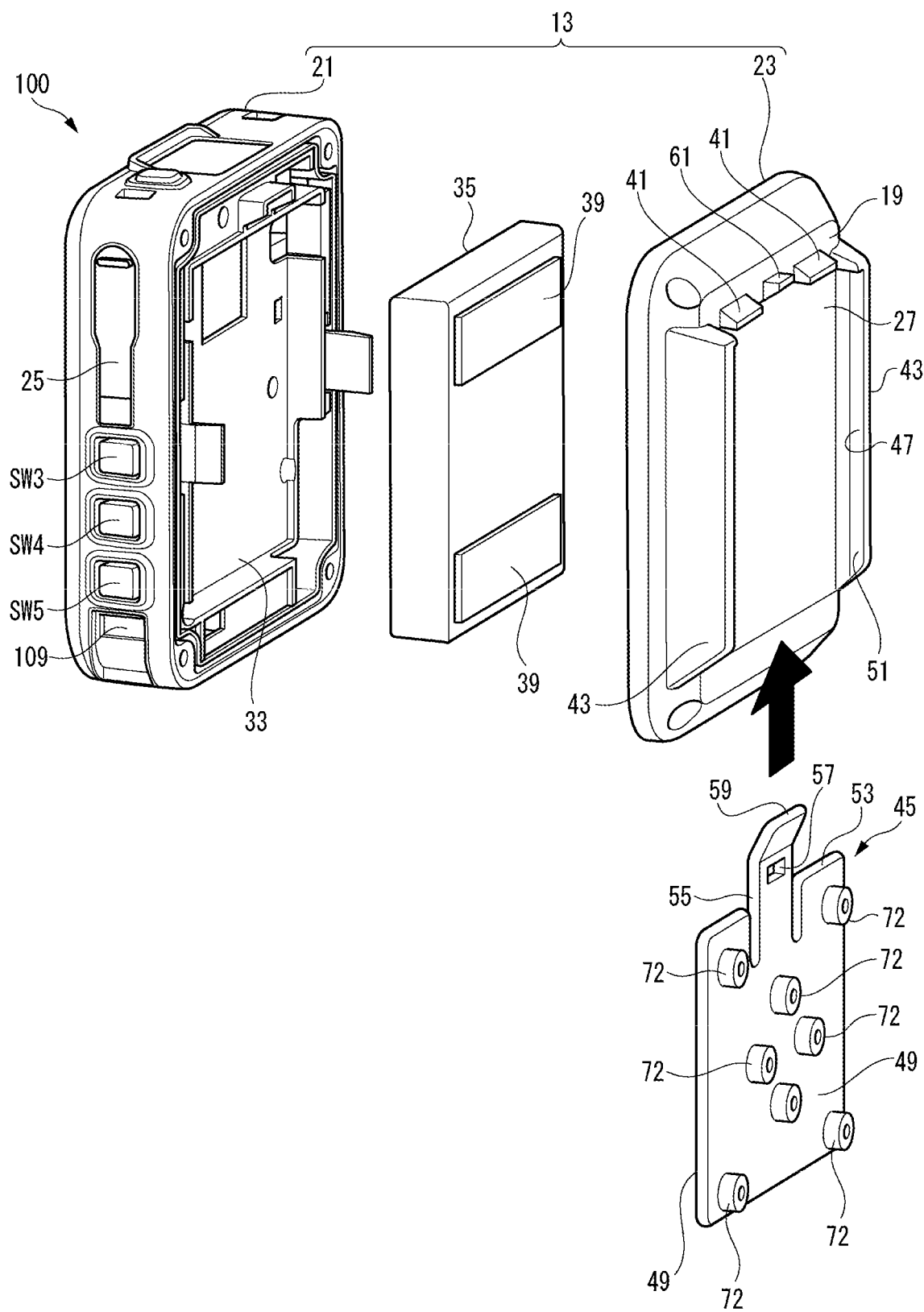
FIG. 8 is an exploded perspective view showing a mounting direction of a plate.

FIG. 8 is an exploded perspective view showing a mounting direction of plate 45.

Plate 45 may slide freely along attachment surface 27 by inserting both side edges 49 from opening 51 of lower end toward groove 47 of right and left facing wall portions 43. Plate 45 inserted with both side edges 49 guided by grooves 47 of facing wall portion 43 comes in contact with protrusion 41 at the upper end so as to be attached at the mounting position of attachment surface 27.

Plate 45 is provided with locking piece 55 extending upward from upper edge 53. Locking piece 55 includes locking hole 57 and may be elastically deformed in a direction away from casing 13. Finger hook portion 59 which is inclined in a direction away from casing 13 toward the extended tip is formed at the extended tip of locking piece 55. On the other hand, in back lid 23, locking protrusion 61 is provided between a pair of protrusions 41. Locking protrusion 61 is locked with locking hole 57 of locking piece 55 to restrict the upward movement of casing 13 with respect to plate 45 of the clip.

Figure 9:
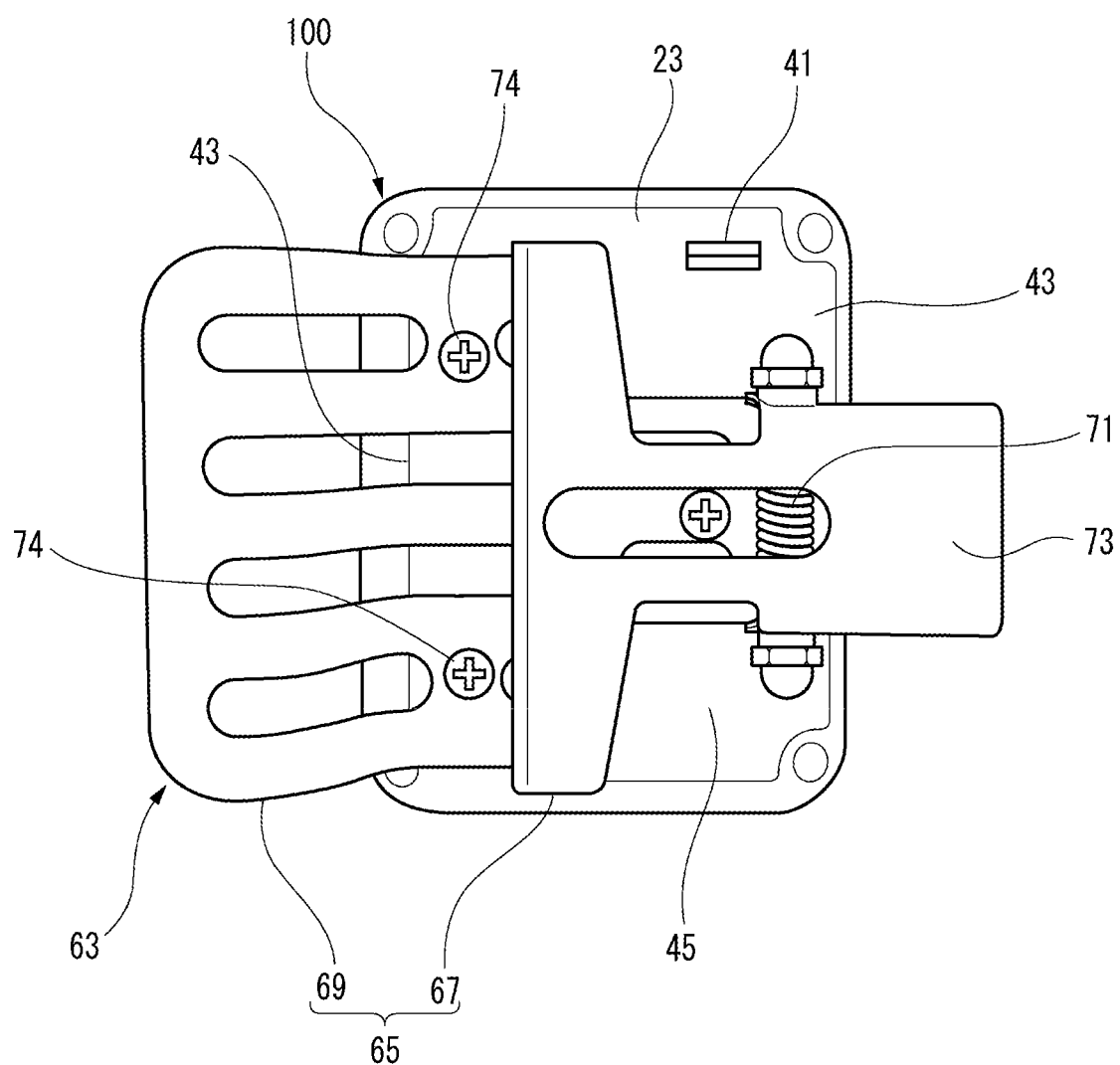
FIG. 9 is a rear view of the wearable camera with a clip attached.

FIG. 9 is a rear view of the wearable camera with clip 63 attached.

Clip 63 includes clamp 65 fixed to plate 45. Clamp 65 has, for example, inner clamping plate 67 inserted in the inside of the edge portions of the right and left joints of the clothes at the front, and outer clamping plate 69 arranged outside the edge portions. In clip 63, inner clamping plate 67 and outer clamping plate 69 are urged in the approaching direction by coil spring 71. In clip 63, knob 73 is interposed between the fingers of police officer 11, and inner clamping plate 67 and outer clamping plate 69 are opened against the urging force of coil spring 71, and then the edge portions of the right and left joints at the front may be clamped by inner clamping plate 67 and outer clamping plate 69.

Clamp 65 is attachable so that clamp 65 faces either side of plate 45 in the left-right direction. In clip 63, right and left hands are selectable by selectively using three fixing portions 72 (see FIG. 7) on the right side of plate 45 or three fixing portions 72 (see FIG. 7) on the left side and fixing outer clamping plate 69 of clamp 65 to plate 45 by fixing screws 74 shown in FIG. 9.

Next, an operation of the above configuration will be described.

In wearable camera 100, plate 45 of clip 63 is attached to attachment surface 27 of casing 13. When casing 13 tries to move downward with respect to clip 63, protrusion 41 formed at the upper end of attachment surface 27 comes in contact with plate 45 of clip 63. As a result, casing 13 is restricted from moving in the downward direction parallel to attachment surface 27, and the state at the time of mounting is maintained.

In clip 63, clamp 65 fixed to plate 45 is attached by clamping one of the edge portions of the right and left joints, for example, around the front of the clothes. As a result, in wearable camera, casing 13 is fixed to clothes via clip 63. At the time of detachment, police officer 11 cancels clamping by clamp 65 and removes wearable camera 100 from, for example, the clothes and the like together with clip 63.

Thereafter, the engagement of plate 45 with attachment surface 27 is released, and clip 63 is removed from casing 13. In wearable camera 100 from which clip 63 is removed, no casing holding member remains on attachment surface 27, and it is possible to set wearable camera 100 to charger as it is.

In wearable camera 100, it is also possible to remove only casing 13 from the clothes or the like with clip 63 clamped to the clothes or the like by releasing engagement with clip 63 holding the clothes or the like. In this case, wearable camera 100 may be set to the charger as it is.

In addition, in wearable camera 100, the attachment is carried out by sliding plate 45 from the lower side parallel to attachment surface 27 with respect to attachment surface 27 of casing 13. When plate 45 is slid and locking piece 55 of upper edge 53 reaches locking protrusion 61, locking piece 55 is elastically deformed in the direction away from casing 13 by the reaction force from locking protrusion 61. Further, when plate 45 is slid, locking protrusion 61 coincides with locking hole 57 of locking piece 55, and locking hole 57 of locking piece 55 is locked with locking protrusion 61 by elastic force of locking piece 55. As a result, the upward movement of casing 13 relative to plate 45 is also restricted by locking piece 55 locked with locking protrusion 61.

Casing 13 is unlocked from locking hole 57 and locking protrusion 61 by releasing finger hook portion 59 of locking piece 55 in a direction away from casing 13 by the fingers of police officer 11. Unlocked casing 13 by locking piece 55 may slide in the upward direction with respect to plate 45 and may be removed from clip 63.

Figure 10:
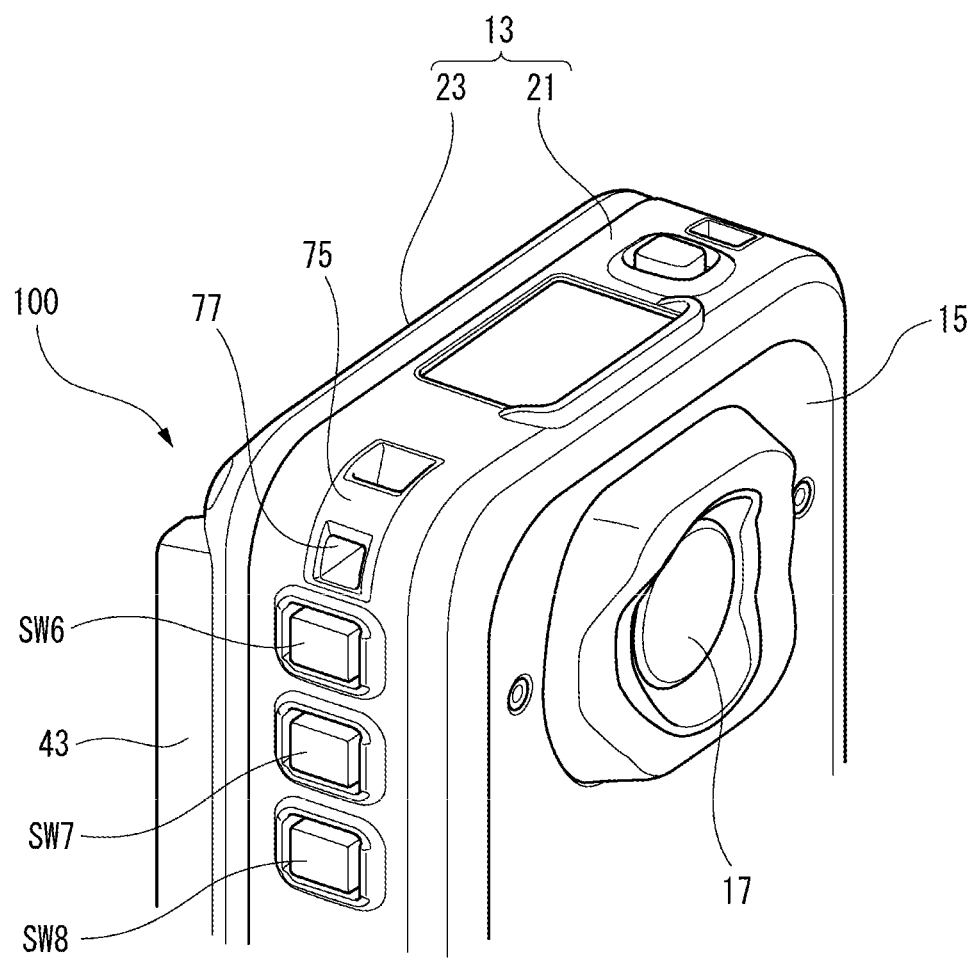
FIG. 10 is an enlarged perspective view of a shaft portion for strap attachment.

Configuration Example of Strap FIG. 10 is an enlarged perspective view of shaft portion 75 for strap attachment.

In the wearable camera, casing 13 includes recess portion 77 and shaft portion 75. Both ends of shaft portion 75 are fixed to the facing inner wall surface of recess portion 77. An annular cord formed at the proximal end of the strap may be connected to shaft portion 75.

On the left side surface of casing 13 of wearable camera 100 as viewed from the front, attribute assignment switches SW 6 to SW 8 and the like are provided below shaft portion 75. Attribute assignment switches SW 6 to SW 8 assigns attribute information (for example, information indicating the type of video data) according to a current setting state to the video data currently being recorded or the video data recorded just before. The type of the video data indicates, for example, a case of murder, robbery, and fire or a kind of accident.

FIG. 11A is a perspective view of a main part showing an example of strap 79 attached to shaft portion 75. FIG. 11B is a perspective view of a main part showing a modification example of hook 83.

Strap 79 may have a structure in which both ends of a cord (for example, winding cord 81) and both ends of holding cord 85 having hook 83 for fixing to the clothes or the like are bundled and fixed by fastener 87. In strap 79, winding cord 81 on one end side is inserted between shaft portion 75 and recess portion 77, and holding cord 85 on the other end side is inserted through an annular portion of winding cord 81, whereby winding cord 81 may be wound around shaft portion 75 and attached. Strap 79 with winding cord 81 wound around shaft portion 75 may hold wearable camera 100 on the clothes or the like by hooking hook 83 of holding cord 85 to the clothes or the like. As a result, strap 79 may supplementally support the falling-off prevention of wearable camera 100 of the magnet type specification and the clip specification.

Hook 83 attached to strap 79 may be clamping tool 93 such that when operating piece 89 is opened, clamping plate 91 is opened, and when operating piece 89 is closed, clamping plate 91 clamps the clothes and gets locked.

In wearable camera 100, casing 13 is connected to the clothes of the user and the like via strap 79. Casing 13 is prevented from falling off by the casing holding member and strap 79 in two ways. As a result, even if the casing holding member comes off the clothes and the like, even if casing 13 comes off the casing holding member, it is possible to reliably prevent the falling-off of wearable camera 100 by strap 79.

Configuration Example of Charger

Figure 12:
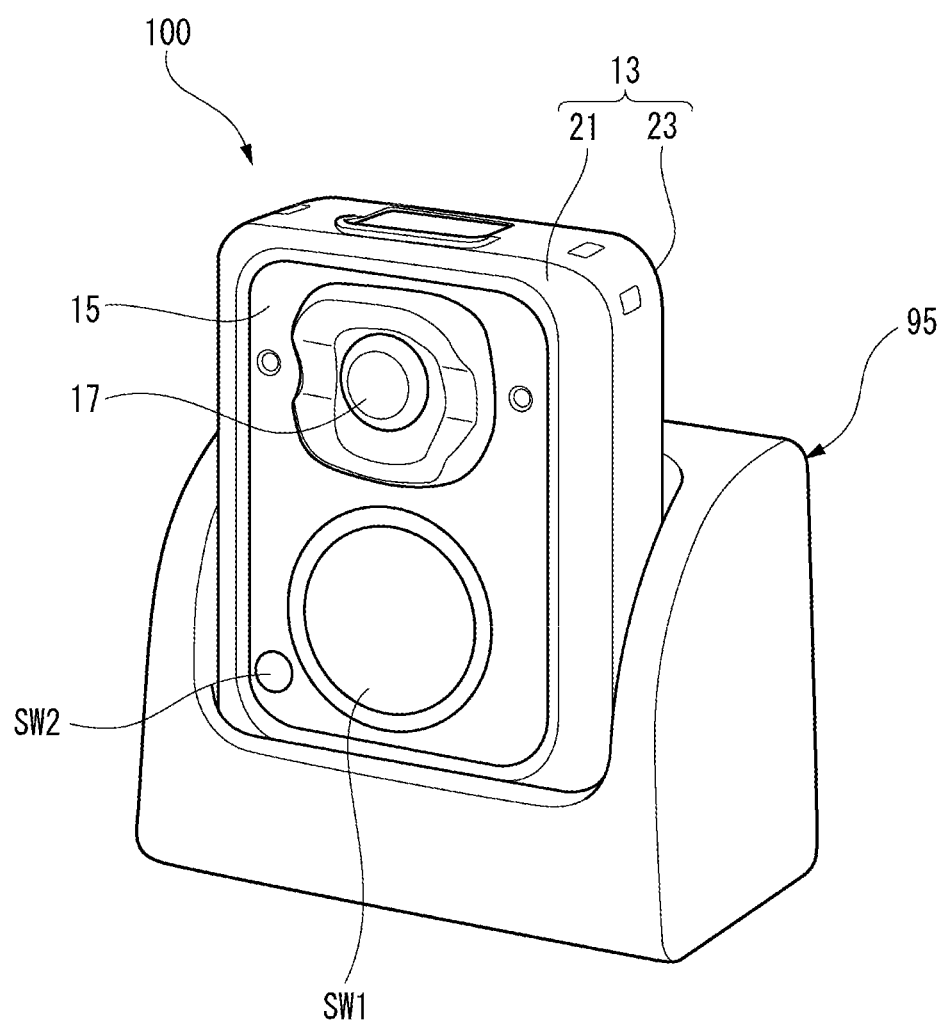
FIG. 12 is a perspective view of the wearable camera set in a charger.

FIG. 12 is a perspective view of wearable camera 100 set in charger 95.

Wearable camera 100 is held (set) in an upright state with respect to charger 95 by inserting the lower part into charger 95. In this set state, wearable camera 100 performs charging by connecting the contact terminal provided on the lower surface of casing 13 to charging contact 97 (see FIG. 13) of charger 95 to perform charging.

In this configuration example, in wearable camera 100, in a case where wearable camera 100 is set to be a first camera, connector 101 of cable 99 connected to an auxiliary device such as a second camera and the like is connected to accessory connecting portion 25 on the right side as viewed from the front of casing 13.

Figure 13:
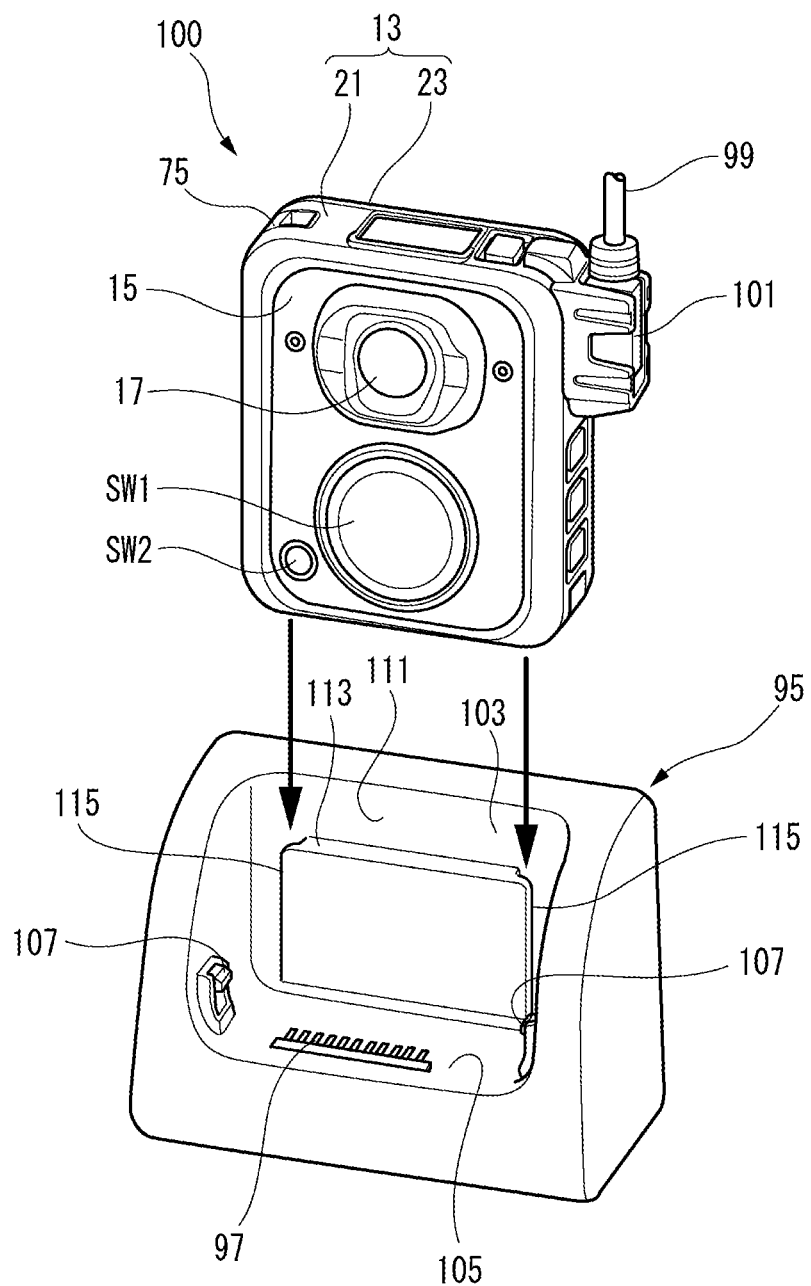
FIG. 13 is an exploded perspective view of the charger and the wearable camera before setting as seen from a front surface side.

FIG. 13 is an exploded perspective view of charger 95 and wearable camera 100 before setting as seen from a front surface side.

In charger 95, holding recess portion 103 for inserting the lower portion of wearable camera 100 is formed. On bottom surface 105 of holding recess portion 103, charging contact 97 which is connected to the contact terminal of casing 13 is provided. Holding recess portion 103 is provided with locking claws 107 on the right and left inner surfaces with bottom surface 105 interposed therebetween, respectively. Locking claw 107 is locked with locking recess portion 109 formed in the lower part of both side surfaces of casing 13. As a result, charger 95 is prevented from being detached due to shock, vibration or the like of wearable camera 100 inserted into holding recess portion 103. Locking claw 107 may release the locking with locking recess portion 109 by operating a lock release button (not shown) provided on charger 95.

On back-wall surface 111 of holding recess portion 103, rectangular plate-like base portion 113 is formed to protrude from back wall surface 111. The dimension in the left-right direction of base portion 113 is substantially the same as or the same as the distance between the pair of facing wall portions 43 of casing 13. Engaging pieces 115 protruding outward are formed from the right and left sides extending vertically of base portion 113. Right and left engaging pieces 115 may enter groove 47 formed in the pair of facing wall portions 43. That is, when wearable camera 100 is inserted into holding recess portion 103 of charger 95, attachment surface 27 is brought into close contact with base portion 113, engaging piece 115 is locked with groove 47 of facing wall portion 43, and locking claw 107 is locked with locking recess portion 109.

As a result, wearable camera 100 shares facing wall portion 43 for restricting the movement of the casing holding member so as to prevent positional deviation between the contact terminal and charging contact 97 and realize firm camera fixing.

Figure 14:
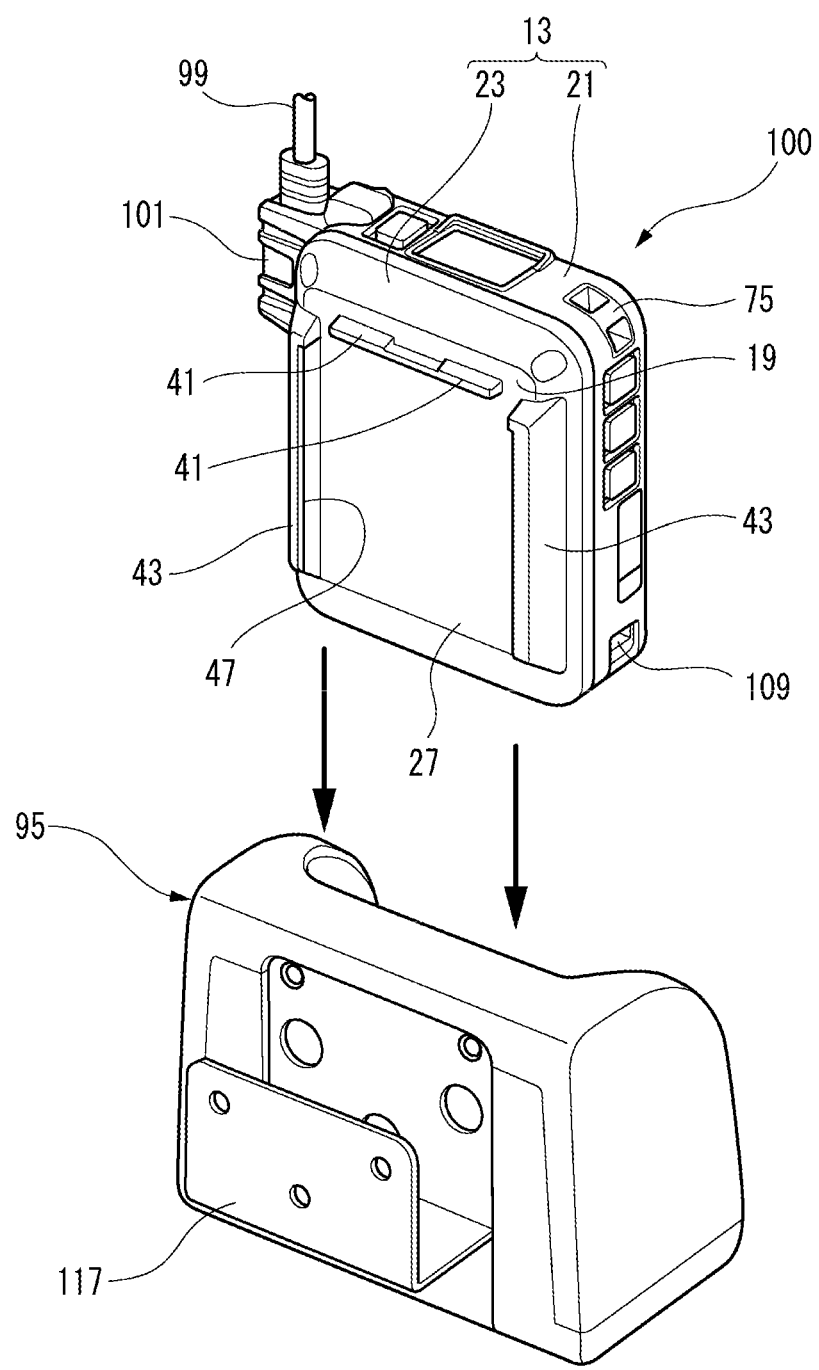
FIG. 14 is an exploded perspective view of the charger and the wearable camera before setting as seen from a rear surface side.

FIG. 14 is an exploded perspective view of charger 95 and wearable camera 100 before setting as seen from a rear surface side.

In charger 95, vehicle attachment member 117 is fixed to the rear portion. Charger 95 is fixed to a vehicle (for example, a patrol car (so-called police car) on which police officer 11 rides) by vehicle attachment member 117. Wearable camera 100 held by charger 95 fixed to the vehicle may be strongly held by charger 95 by a plurality of engaging structures described above, and it is difficult for wearable camera 100 to fall off due to vibration or the like during running of the vehicle.

Therefore, according to wearable camera 100 according to the present embodiment, it is possible to improve usability and further prevent falling-off.

While various embodiments have been described with reference to the drawings, it goes without saying that the present disclosure is not limited to such examples. Within the category described in the claims, it will be apparent to those skilled in the art that various changed examples or modification examples may be conceived, and it should be understood that such modifications naturally belong to the technical scope of the present disclosure.

For example, in the above configuration example, a case where a magnet is placed in a pocket is described as an example, but in the wearable camera of the present embodiment, the magnet may be attached to the clothes by means such as a clip, and the casing may be attached to the magnet.

The present disclosure is useful as a wearable camera capable of improving usability and further suppressing falling-off from a mounting state at the time of use.

What is claimed is:

1. A wearable camera comprising:
    a casing that includes a front surface having a lens and a rear surface serving as a surface on a mounting side;
    an attachment surface that is formed on the rear surface and on which a casing holding member is detachably attached; and
    a protrusion that protrudes from the casing in the vicinity of an upper end of the attachment surface and comes in contact with the casing holding member attached to the attachment surface,
    wherein rotation of the case holding member around an axis perpendicular to the attachment surface is restricted.

2. The wearable camera of claim 1 further comprising a metal plate inside the casing near a backside of the attachment surface, the attachment surface interposed between the metal place and the casing holding member, the casing holding member is a magnet.

3. The wearable camera of claim 1,
    wherein the casing holding member is a clip that has a plate attached to the attachment surface and that is provided with a clamp on the plate.

4. The wearable camera of claim 1,
    wherein the casing includes a pair of facing wall portions protruding from a right side and a left side away from the rear surface, the attachment surface interposed between the pair of facing wall portions.

5. The wearable camera of claim 3,
    wherein the plate includes a locking piece having a locking hole and extending upward from an upper edge so as to be elastically deformable in a direction away from the casing, and the casing includes a locking protrusion that engages the locking hole to restrict upward movement of the casing with respect to the casing holding member.

6. The wearable camera of claim 1,
    wherein the casing includes a shaft portion of which each end of shaft portion is fixed to a facing inner wall surface of the recess portion.

7. The wearable camera of claim 4 wherein a distance between the pair of facing wall portions is set slightly larger than a width of the casing holding member in a same direction.

8. The wearable camera of claim 1,
    wherein the casing includes locking recess portions formed in the lower part of both side surfaces of the casing.

9. The wearable camera of claim 1, wherein the case holding member is a portion of a charger for the wearable camera.

10. The wearable camera of claim 1, further comprising a pair of facing wall portions, one of the pair of facing wall portions located on one side of the attachment surface to which the case holding member is detachably attached and the other of the pair of facing wall portions located on another side of the attachment surface to which the case holding member is detachably attached.

11. The wearable camera of claim 10, wherein the pair of facing wall portions are parallel.

12. The wearable camera of claim 10, where each of the pair of facing wall portions includes a groove.

13. A wearable camera comprising:
    a casing that includes a front surface having a lens and a rear surface serving as a surface on a mounting side;
    an attachment surface that is formed on the rear surface and on which a casing holding member is detachably attached; and
    a pair of facing wall portions protruding from a right side and a left side away from the rear surface, the attachment surface interposed between the pair of facing wall portions, wherein rotation of the case holding member around an axis perpendicular to the attachment surface is restricted by at least one of the pair of facing wall portions.

* * * * *